United States Patent [19]

Wilkes et al.

[11] 3,747,966
[45] July 24, 1973

[54] SHAFT COUPLING MECHANISM

[75] Inventors: Raymond Steele Wilkes, Ottumwa, Iowa; Homer D. Witzel, Moline, Ill.

[73] Assignee: Deere & Company, Moline, Ill.

[22] Filed: Sept. 15, 1971

[21] Appl. No.: 180,603

[52] U.S. Cl. .................. 287/119 R, 64/6, 64/32 R, 285/277, 287/53 SS
[51] Int. Cl. ............................................. F16d 1/00
[58] Field of Search ...................... 64/32 R, 4, 3, 6; 287/53 SS, 119 R; 285/277

[56] References Cited
UNITED STATES PATENTS

| | | | |
|---|---|---|---|
| 3,073,192 | 1/1963 | Beers .............................. | 287/53 SS |
| 3,260,541 | 7/1966 | Sadler et al. ..................... | 287/53 SS |
| 3,357,206 | 12/1967 | Christie ............................ | 64/6 |
| 3,503,225 | 3/1970 | Shindelar et al. ................. | 64/4 |
| 3,551,013 | 12/1970 | Trojanowski et al. ............ | 64/6 |

*Primary Examiner*—Charles J. Myhre
*Assistant Examiner*—Randall Heald
*Attorney*—H. Vincent Harsha, William A. Murray et al.

[57] ABSTRACT

Mechanism for coupling an externally splined power take-off shaft with a hollow internally splined shaft, comprising a plurality of locking elements radially movable between inner locking and outer unlocking positions within a like plurality of circumferentially spaced apertures in the wall of the hollow shaft, the elements being engageable in the former position with a circumferential groove in the power take-off shaft to lock the shafts against relative axial movement. A retaining member is axially slidable on the periphery of the hollow shaft between a first position wherein it surrounds the locking elements and prevents their disengagement from the groove in the power shaft and a second position wherein the elements are free to move to their unlocking position, the member being biased toward the former position. A latch ring on the hollow shaft is operable to move the retaining member from its first to its second position, and is engageable with a recess in the periphery of the hollow shaft to lock the member in the latter position. As the hollow shaft is inserted onto the power take-off shaft, the latter engages and moves the locking elements radially outwardly against the latch ring, thereby disengaging the ring from the recess in the hollow shaft and permitting the retaining member to move back toward its first position.

21 Claims, 8 Drawing Figures

PATENTED JUL 24 1973 3,747,966

*INVENTORS*
RAYMOND S. WILKES
HOMER D. WITZEL

BY

*John O. Hayes*
ATTORNEY

SHAFT COUPLING MECHANISM

BACKGROUND OF THE INVENTION

The present invention relates generally to shaft coupling apparatus of the type having a plurality of radially movable locking elements in one shaft engageable with a circumferentail recess in the other shaft, and more particularly to such apparatus having means facilitating the coupling of the shafts.

An agricultural tractor conventionally includes an externally splined power take-off shaft extending longitudinally from the rear portion thereof, to which is connectible, for powering various towed or rear mounted implements, a power transmission shaft having a hollow, internally splined portion at its forward end. To accommodate relative movement between the tractor and the implement, the latter shaft is conventionally provided with a universal joint adjacent to each of its ends. Since an exposed, rotating shaft presents a serious safety hazard, substantial efforts have been put forth in the past by those working in the art to develop suitable shielding for such power transmission shafts, including shielding for the universal joints included thereon. Some results of these efforts are disclosed in U.S. Pat. Nos. 2,772,550, issued Dec. 4, 1956 to Harrington, 3,357,206, issued Dec. 12, 1967 to Christie, and 3,462,975, issued Aug. 26, 1969 to Skromme et al., all of which are assigned to the assignee of the present invention. The shielding devices disclosed in the latter two patents each include a pair of cooperating, bell-shaped shields which surround the universal joint on the forward end of the power shaft. Although effective to prevent contact with the universal joint, shielding devices of this type, when used in combination with a conventional shaft coupling mechanism, also materially increase the effort required to connect the power shaft to the tractor PTO shaft, and it is thus feared that such shields will not gain general acceptance and use.

The problems encountered in connecting a shielded shaft to a PTO shaft result in large part from the apparatus conventionally employed to axially lock the two shafts together, that apparatus including a plurality of locking elements radially movable in apertures in the hollow portion of the power shaft and engageable in the radial inner position with a circumferential groove near the outer end of the PTO shaft. A retaining member is employed to maintain the locking elements in their inner locking position during operation of the shafts, the member being axially movable against the biasing force of a spring to permit the elements to move radially outwardly and thereby release the two shafts from their axially locked position. To connect the power shaft with the PTO shaft, the retaining member must thus be held axially against the biasing force of the spring simultaneously as the splines on the power shaft are mated with those on the PTO shaft and the power shaft is aligned with and inserted axially on the PTO shaft. The presence of a shield enclosing the power shaft and universal joint thereof substantially increases the difficulty of this task.

SUMMARY OF THE INVENTION

Accordingly, it is the primary object of the present invention to provide apparatus facilitating the task of coupling a shielded power shaft to a tractor PTO shaft. More particularly, it is an object to provide apparatus for locking the retaining member on the power shaft axially against the force of its biasing spring, thereby permitting insertion of the power shaft on the PTO shaft without the necessity of simultaneously holding the member against the spring. It is another object to provide such apparatus having means for releasing the retaining member from its locked position automatically in response to insertion of the power shaft onto the PTO shaft. It is yet another object to provide such apparatus including a collar on the end of the power shaft for axially locking the retaining member against the force of the biasing spring, the collar being rotatably lockable to the shaft when the retaining member is axially locked thereon, to facilitate aligning the splines on the power shaft with those on the PTO shaft.

In pursuance of these and other objects, the invention comprises, generally, a latch ring slidably mounted on the power shaft and engageable with the locking element retaining member for moving the latter against the spring biasing force to a position axially removed from the locking elements. Means are provided in the form of a recess in the periphery of the power shaft engageable by the latch ring to axially lock the latter, and thereby the retaining member, against the biasing force, and in addition to rotatably lock the latch ring to the power shaft. When so locked, the latch ring extends around the retaining elements in eccentric relation with the power shaft and is operative to retain at least one of the locking elements in its inner, locking position. As the power shaft is inserted on the tractor PTO shaft, the beveled end portion of the latter engages that element and urges it radially outwardly against the latch ring, thereby centering the ring on the power shaft and disengaging it from the recess therein. When the circumferential recess in the PTO shaft is aligned with the locking elements on the power shaft, the retaining member is operative to urge the elements into engagement with the recess, thereby locking the shafts against relative axial movement.

BRIEF DESCRIPTION OF THE DRAWINGS

The preferred embodiment of the present invention will be described in conjunction with the accompanying drawings in which.

DESCRIPTION OF THE PREFERRED EMBODIMENT

Figure 1:
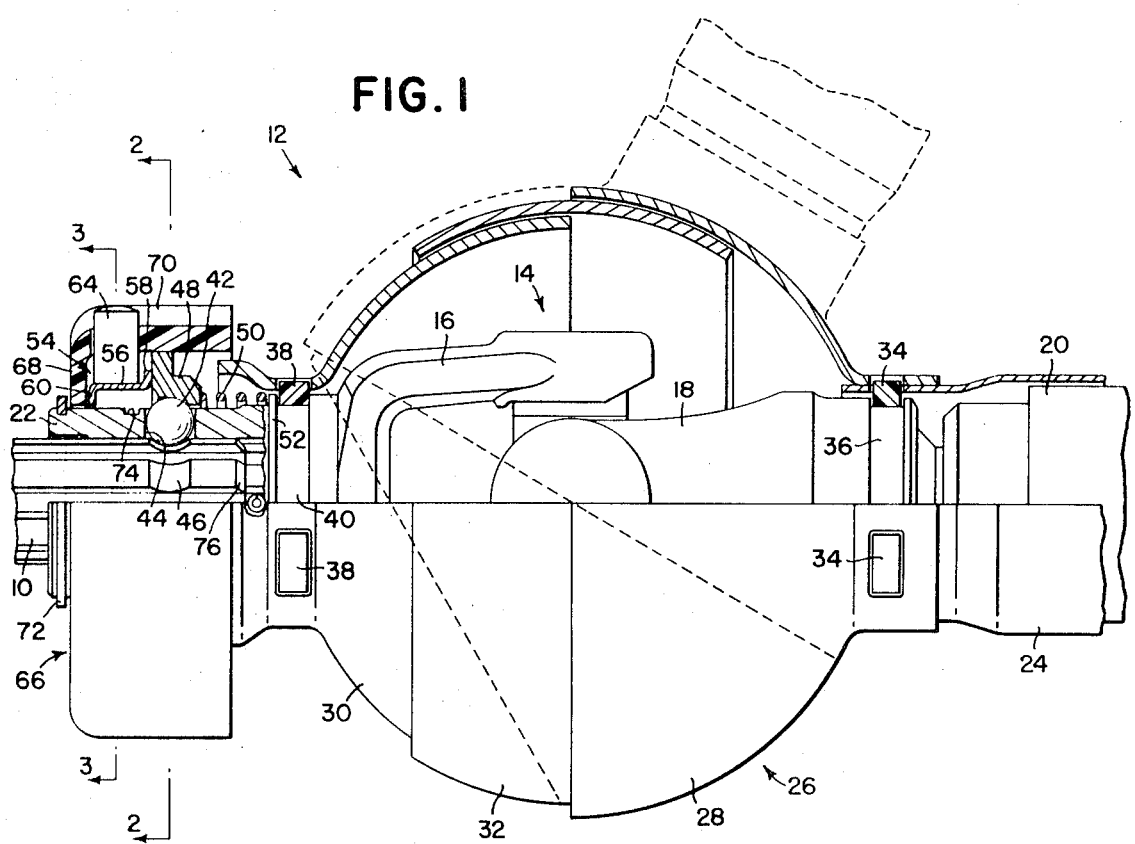
FIG. 1 is a view of the shaft coupling mechanism of the invention, with portions broken away and in section, showing the shafts in their axially locked position.

Referring first to FIG. 1 of the drawings, the shaft coupling mechanism of the invention includes an externally splined shaft 10 which may, for example, comprise the power take-off shaft of an agricultural tractor, and a mating, internally splined power transmission shaft 12 of the type conventionally employed to drivingly connect a PTO shaft with a trailing or rear mounted implement. To accommodate relative movement between the tractor and the implement, the shaft 12 is provided with a universal joint 14 adjacent to its forward end, the joint 14 comprising a pair of pivotally interconnected front and rear yode members 16 and 18, respectively. The rear yoke member 18 is non-rotatably fixed to the forward end of an elongated shaft 20, shown only partially in FIG. 1, while the front yoke member 16 has a forwardly extending hollow hub portion 22 integral with its forward end and internally splined to axially receive the shaft 10.

To guard against accidental contact with the rotating power shaft 12, the latter is provided with safety shielding of the type disclosed in U.S. Pat. No. 3,462,975 issued Aug. 26, 1969 to Skromme et al. and consisting, generally, of a cylindrical shield 24 for the shaft portion 20, and a three-section spherical shield 26 for the universal joint 14. The spherical shield 26 comprises a first bell-shaped member 28 rotatably supported on the yoke 18 and extending forwardly over the rear portion of the joint 14, a second bell-shaped member 30 rotatably supported on the yoke 16 and extending rearwardly over the forward portion of the joint 14, and a closure member 32 overlapping the adjacent portions of the members 28 and 30 and operative to prevent gaps therebetween when the yokes 16 and 18 pivot relative to each other, as indicated in dashed lines in FIG. 1. The adjacent edges of the shield members 24 and 28 overlap and are commonly axially locked to the yoke 18 by means of a plurality of retaining elements 34 slidably received in a circumferential groove 36 formed in the yoke 18. Although axially locked thereto, the members 24 and 28 are free to rotate relative to the power shaft 12 and thereby perform their protective function. In a like manner, a plurality of retaining elements 38 slidably received in a circumferential groove 40 formed in the yoke 16 are operative to rotatably mount the forward bell-shaped member 30 on the yoke 16 and to normally prevent relative axial movement therebetween.

Figure 2:
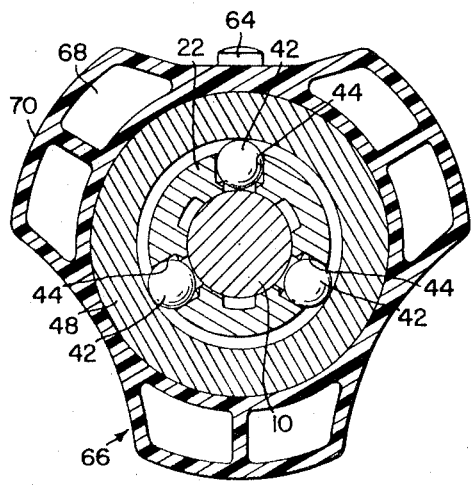
FIG. 2 is a sectional view taken along the line 2—2 of FIG. 1.
Figure 5:
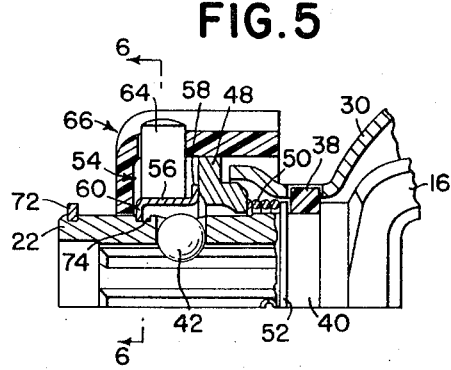
FIG. 5 is a view similar to FIG. 4, showing the latch ring and retaining member axially locked on the internally splined shaft, in preparation for insertion of the latter on the externally splined shaft.
Figure 8:
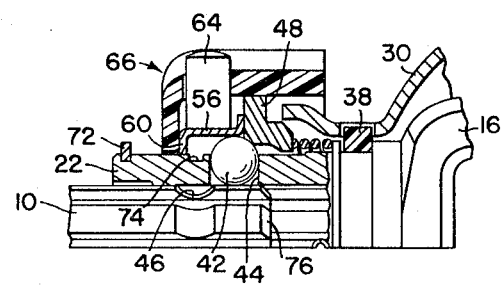
FIG. 8 is a view similar to FIGS. 4 and 5, showing the internally splined shaft partially inserted on the externally splined shaft and the latch ring and retaining member released from their axially locked position.

The mechanism employed to axially lock the power shaft 12 on the PTO shaft 10 comprises three locking elements or balls 42 received for radial movement in three equally spaced apertures 44 extending through the wall of the hub 22. The balls 42 are movable in the apertures 44 between a radial outward, unlocking position wherein the hub 22 is free to move axially on the shaft 10 (see FIG. 8), and a radial inward, locking position wherein the balls 42 are operative to engage a circumferential recess 46 formed near the terminal end of the shaft 10 and thereby axially lock the hub 22 on the shaft 10 (see FIG. 1). As shown best in FIG. 2, the inner ends of the apertures 44 converge inwardly to prevent the balls from falling therethrough when the hub 22 is removed from the PTO shaft 10. The balls 42 are normally maintained in their inward, locking position by means of a retaining ring 48 axially slidable on the periphery of the hub portion 22 between a first position shown in FIG. 1, in which the ring 48 surrounds the balls 42 and prevents their radial outward movement, and a second position shown in FIG. 5, in which the ring 48 is spaced rearwardly from the balls 42. A coil spring 50 acts between the rear side of the ring 48 and a flange 52 on the hub portion 22 to bias the former toward its first position.

The operation of the mechanism described thus far is well known in the art. To insert the hub 22 on the shaft 10, the retaining ring 48 must be moved axially against the force of the spring 50 to permit the balls 42 to move radially outwardly to their unlocking position and to thereby permit passage of the shaft 10 through the hub 22. When the balls 42 are aligned with the groove 46 on the shaft 10, the retaining ring 48 must then be released for return to its initial position. In the past, this manipulation of the retaining ring 48 was performed simultaneously as the hub 22 was inserted on the shaft 10. The addition of the previously-described safety shielding to the power shaft 12 has substantially complicated this manipulation, however, and, since the shielding is rotatably mounted on the power shaft 12, its addition has also complicated the task of aligning the splines on the hub 22 with those on the PTO shaft 10.

According to the present invention, a latch ring 54 is slidably mounted on the periphery of the hub 22 forwardly of the retaining ring 48 and is engageable therewith to move the ring 48 rearwardly against the urging of the spring 50. The latch ring 54 comprises an axially extending portion 56, a radially outwardly extending flange portion 58 at the rearward end of the portion 56 and engageable with the front radial side of the retaining ring 48, a radially inwardly extending projection 60 at the forward end of the portion 56, and a semicircular, radially inwardly extending flange portion 62 lying generally in the same plane as the projection 60. Fixed to and extending outwardly from the portion 56 of the ring 54 is a cylindrical button 64. A collar 66 loosely surrounds the latch ring 54, as well as the retaining ring 48, and includes a radial portion 68 slidably received by the hub 22, and an axial portion 70 extending rearwardly in overlying relation with the forward end of the bell-shaped shield member 30 and having an aperture through which the outer end of the button 64 extends. A removable ring 72, engageable with a circumferential groove in the forward end of the hub 22, is normally operable to prevent removal of the collar 66 from the hub 22. It will be apparent from the structure described that the collar 66 and latch ring 54 are rotatable as a unit relative to the hub 22, the collar thus serving as a shield member for the extreme forward end of the power shaft 12.

Figure 3:
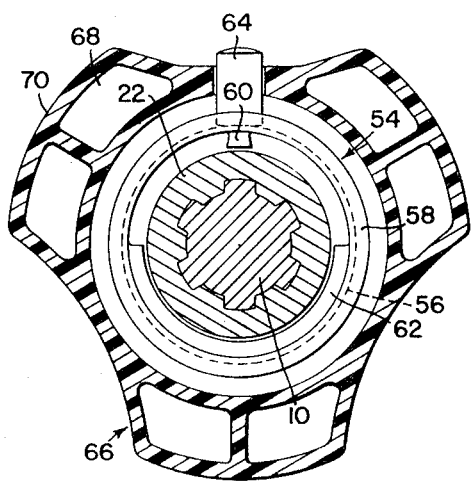
FIG. 3 is a sectional view taken along the line 3—3 of FIG. 1.
Figure 4:
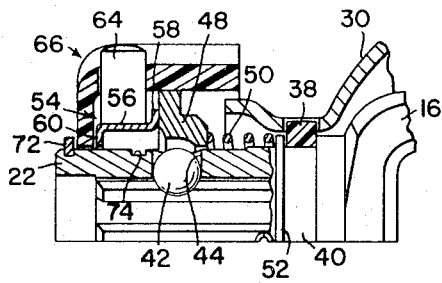
FIG. 4 is a partial sectional view of the mechanism shown in FIG. 1, with the externally splined shaft removed.
Figure 6:
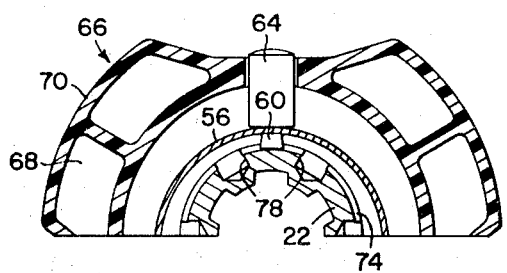
FIG. 6 is a sectional view taken along the line 6—6 of FIG. 5.

In the normal position of the latch ring 54, shown in FIGS. 1, 3, and 4, the projection 60 and flange 62 act as spacers to maintain the axial portion 56 of the latch ring in concentric relation with the hub 22. When moved axially rearwardly against the spring 50 and urged radially inwardly by means of the button 64, the projection 60 on the ring 54 is engageable with a circumferentially extending groove 74 formed in the periphery of the hub 22 to lock the ring 54 axially relative to the hub and to thereby lock the retaining ring 48 in its rearward position (see FIG. 5). When so locked, the axial portion 56 of the latch ring 54 is disposed eccentrically relative to the hub 22, as indicated in FIGS. 6 and 7, and is operative to prevent at least one of the balls 42 from moving radially outwardly to its unlocking position. As the hub 22 is inserted on the PTO shaft 10, the beveled end portion 76 of the latter engages that ball and urges it outwardly against the latch ring 54, thereby disengaging the projection 60 from the groove 74 and releasing the retaining ring 48. The ring 48 is then urged forwardly against the balls 42 by the spring 50 (see FIG. 8), the ring thus exerting a radial inward force on the balls which causes them to drop into the groove 46 in the shaft 10 when the hub 22 is properly positioned thereon. Whe the balls 42 are positioned in the groove 46, the retaining ring 48 is then free to move forwardly to its position surrounding the balls, shown in FIG. 1.

Figure 7:
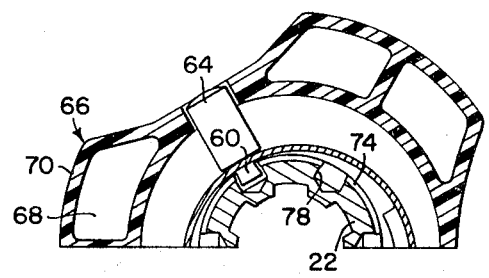
FIG. 7 is a sectional view similar to FIG. 6, but showing the latch ring rotated slightly relative to the internally splined shaft and rotatably locked thereto.

As illustrated in FIGS. 6 and 7, a series of blind holes 78 are provided at equal intervals along the groove 74 to receive the projection 60 on the latch ring 54. When turned so that the projection 60 engages one of the holes 78, as shown in FIG. 7, the latch ring 54 and collar 66 are rotatably locked to the hub 22, such that the latter can be rotated in response to rotation of the former to align the splines in the hub 22 with those on the PTO shaft 10.

The sequence of operation of the shaft coupling mechanism will now be described. Beginning with the mechanism in the position shown in FIG. 4, the button 64 is urged inwardly and the collar 66 moved rearwardly against the spring 50 until the projection 60 on the latch ring 54 engages the groove 74 in the hub 22, thereby locking the retaining ring 48 in its rearward position. If necessary to align the splines on the hub 22 with those on the shaft 10, the collar 66 and latch ring 54 can be rotated relative to the hub 22 from the position shown in FIG. 6 to that shown in FIG. 7, in which the projection 60 engages one of the enlarged portions 78 in the groove 74, thereby rotatably locking the collar 66 to the hub 22. The hub 22 can then be rotated by means of the collar 66 to align the splines on the hub with those on the PTO shaft. As the hub 22 is then axially inserted on the shaft 10, the beveled end of the latter contacts the balls 42 and moves them radially outwardly against the latch ring 54, thereby releasing the latter from its locked position (see FIG. 8). Continued movement of the hub 22 brings the balls 42 into alignment with the groove 46 on the shaft 10, whereupon the balls are urged inwardly into engagement with the groove by the spring 50 and retaining ring 48. When the balls are in position in the groove 46, the ring 48 is free to move forwardly to its position surrounding the balls to axially lock the hub 22 on the shaft 10 (see FIG. 1). Removal of the hub from the PTO shaft is accomplished by merely pulling back on the collar 66 without depressing the button 64, thereby moving the ring 48 to its rearward position and permitting the balls 42 to move radially outwardly to their unlocking position.

We claim:

1. In a mechanism for coupling a first shaft having a recess near its terminal end to a second, hollow, shaft adapted to axially receive said first shaft, the mechanism including a plurality of circumferentially spaced locking elements supported on said second shaft and radially movable between an inner, locking position wherein said elements are engageable with the recess in said first shaft and are operable to prevent relative axial movement between said first and second shafts, and an outer, unlocking position wherein said elements permit such relative axial movement, a retaining member axially slidable on the periphery of said second shaft between a first position wherein it is operable to maintain said locking elements in their locking position, and a second position wherein it permits radial movement of said locking elements to their unlocking position, and means acting between said second shaft and said retaining member for biasing the latter axially toward its first position, the improvement comprising: a latch member axially slidable on the periphery of said second shaft and engageable with said retaining member for moving the latter from its first to its second position against said biasing means, said latch member being movable radially inwardly within a recess in the periphery of said second shaft to a latching position wherein it is axially locked against said biasing means, said latch member being operable in its latching position to maintain said retaining member in its second position and to normally maintain at least one of said locking elements in its inner, locking position; said first shaft being engageable with said at least one locking element as it is axially inserted into said second shaft to move said element radially outwardly against said latch member and thereby release the latter from its latching position.

2. The invention defined in claim 1 wherein said latch member comprises a ring encircling said second shaft and having a radially extending portion engageable with the recess in the periphery of said second shaft, said latch member being eccentrically disposed relative to said second shaft when in its latching position.

3. The invention defined in claim 2 wherein the recess in the periphery of said second shaft comprises a continuous, circumferentially extending groove.

4. The invention defined in claim 2 wherein said latch member includes a plurality of radially extending portions operative to maintain said member in concentric relation with said second shaft when said member is released from its latching position.

5. the invention defined in claim 2 including means on said second shaft engageable with said latch member when in its latching position for preventing relative rotational movement between said second shaft and said latch member.

6. The invention defined in claim 5 wherein the recess in the periphery of said second shaft comprises a continuous, circumferentially extending groove, said groove having a plurality of circumferentially spaced enlarged portions formed therein and engageable by the radially extending portion of said latch member to prevent relative rotational movement between said second shaft and said latch member.

7. The invention defined in claim 1 including a collar encircling said latch member and said retaining member and connected to the former for axial and rotational movement therewith.

8. The invention defined in claim 7 including a portion on said latch member extending radially through an aperture in the wall of said collar.

9. The invention defined in claim 8 wherein the radially extending portion of said latch member extending through said collar, and the radially extending portion thereof engageable with the recess in the second shaft are substantially radially aligned, the former portion serving as means for manually urging said latch member into its latching position.

10. The invention defined in claim 7 wherein said latch member and said collar, when the former is released from its latching position, are free to rotate relative to said second shaft.

11. The invention defined in claim 10 including a shield encircling said second shaft and free to rotate relative thereto, said shield having a terminal end extending between said collar and said second shaft.

12. The invention defined in claim 1 wherein said latch member, when released from its latching position, is free to rotate relative to said second shaft.

13. The invention defined in claim 12 wherein the recess in the periphery of said second shaft comprises a continuous, circumferentially extending groove.

14. In a mechanism for coupling a first shaft having a recess near its terminal end to a second, hollow, shaft adapted to axially receive said first shaft, the mechanism including a plurality of circumferentially spaced locking elements supported on the second shaft and radially movable between an inner, locking position wherein said elements are engageable with the recess in said first shaft and are operable to prevent relative axial movement between said first and second shafts, and an outer, unlocking position wherein said elements permit such relative axial movement, a retaining member axially slidable on the periphery of said second shaft between a first position wherein it is operative to maintain said locking elements in their locking position, and a second position wherein it permits radial movement of said locking elements to their unlocking position, and means acting between said second shaft and said retaining member for biasing the latter axially toward its first position, the improvement comprising a latch member axially slidable on the periphery of said second shaft and operative to move the retaining member to its second position against said biasing means; and means for axially locking said latch member on said second shaft against said biasing means and thereby locking said retaining member in its second position, said latch member being releasable from its locked position in response to movement of at least one of said locking elements from its locking to its unlocking position, said first shaft being operative to move at least one of said locking elements from its locking to its unlocking position as said first shaft is inserted axially into said second shaft.

15. The invention defined in claim 14 wherein said means for axially locking said latch member on said second shaft comprises a recess on the outer periphery of said second shaft adapted to receive said latch member, said member surrounding said locking elements in eccentric relation with said second shaft when received by said recess, said locking elements being engageable with said ring and operable to remove the same from said recess as said elements are moved to their unlocking position.

16. In a mechanism for coupling a first shaft having a recess near its terminal end to a second, hollow, shaft adapted to axially receive said first shaft, the mechanism including a plurality of circumferentially spaced locking elements supported on the second shaft and radially movable between an inner, locking position wherein said elements are engageable with the recess in said first shaft and are operable to prevent relative axial movement between said first and second shafts, and an outer, unlocking position wherein said elements permit such relative axial movement, a retaining member axially slidable on the periphery of said second shaft between a first position wherein it is operative to maintain said locking elements in their locking position, and a second position wherein it permits radial movement of said locking elements to their unlocking position, and means acting between said second shaft and said retaining member for biasing the latter axially toward its first position, the improvement comprising: a latch member axially slidable on the periphery of said second shaft and operative to move the retaining member to its second position against said biasing means; and means for axially locking said latch member on said second shaft against said biasing means and thereby locking said retaining member in its second position, said latch member being releasable from its locked position in response to axial insertion of said first shaft into said second shaft.

17. Apparatus for coupling a first shaft having a recess formed in the periphery thereof to a second, hollow shaft adapted to axially receive said first shaft, comprising: at least one locking element supported on said second shaft and movable radially between an inner locking position, wherein said element is engageable with the recess in said first shaft and is operative to axially lock said first and second shafts, and an outer unlocking position, wherein said element is disengaged from said recess and permits relative axial movement of said shafts; a retaining member axially slidable on said second shaft between a first position wherein it overlies said locking element and is operative to retain said element in its inner locking position, and a second position wherein it permits movement of said element to its outer unlocking position; means acting between said second shaft and said retaining member for biasing the latter toward its first position; and a latch member axially slidable on said second shaft and operative to move said retaining member from its first to its second position against said biasing means, said latch member being movable radially inwardly into engagement with a recess in the periphery of said second shaft to a latching position wherein it overlies said locking element and is operative to lock the retaining member in its second position, said latch member being releasable from its latching position in response to movement of said locking element from its locking to its unlocking position, said first shaft being engageable with said locking element and operative to move said element from its locking to its unlocking position as it is axially coupled to said second shaft.

18. A shaft coupling including a hollow shaft having a surface recess and a radial aperture extending through the wall thereof, a locking element radially movable in said aperture between an innermost locking position for engagement with an internal mating shaft and an outer unlocking position out of engagement with said internal mating shaft, a retaining member axially slidable on said hollow shaft between a first position maintaining said locking element in its locking position and a second position permitting radial movement of said locking element to its unlocking position, biasing means axially biasing said retaining member toward its first position, and a latch member axially slidable on the periphery of said hollow shaft and engageable with said retaining member for moving the latter from its first to its second position against said biasing means, said latch member being shiftable radially to seat in said surface recess for axially locking it in radial relation to said locking element to retain said locking element in its inner locking position.

19. Shaft coupling apparatus comprising: a hollow shaft having a surface recess; a locking element supported on said hollow shaft and movable between an inner locking position for engagement with a mating shaft axially received by said hollow shaft and an outer unlocking position out of engagement with said mating shaft; a retaining member axially movable on said hollow shaft between a first position maintaining said locking element in its locking position and a secod position permitting radial movement of said locking element to its unlocking position; biasing means axially biasing said retaining member toward its first position; and a latch member axially movable on said hollow shaft and operative to move the retaining member to its second position against said biasing means, said latch member being shiftable radially to seat in said surface recess in said hollow shaft for axially locking said retaining member in its second position, said latch member radially overlying said locking element when seated in said recess and being disengageable from said recess in response to movement of said locking element to its outer unlocking position, said mating shaft being engageable with and operative to move said locking element to its outer unlocking position as said mating shaft is axially inserted into said hollow shaft.

20. The invention defined in claim 19 wherein the surface recess in said hollow shaft comprises a continuous, circumferentially extending groove, and wherein said latch member comprises a ring encircling said hollow shaft and having a radially extending portion engageable with said groove.

21. The invention defined in claim 19 including means for rotatably locking said hollow shaft to said latch member when the latter is seated in said recess.

* * * * *